Nov. 14, 1967    C. E. ROSSI    3,352,550
SHAFT KILN DISCHARGE MECHANISM
Filed Sept. 27, 1965
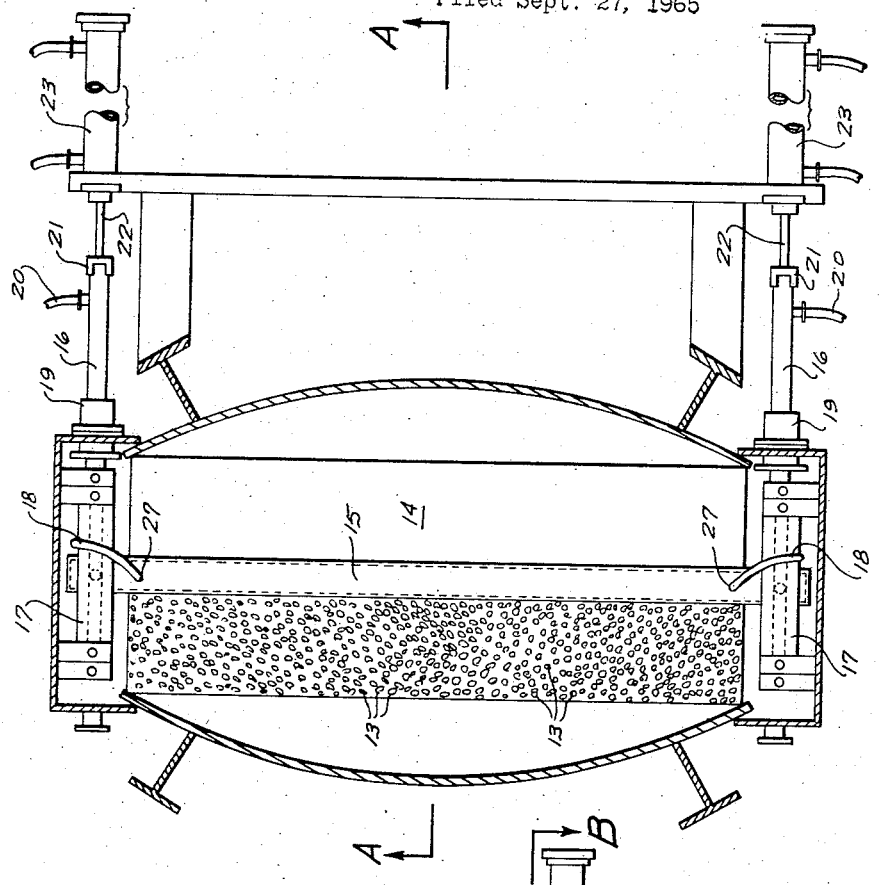
INVENTOR.
CARL E. ROSSI
BY
*William C. Nealon*
ATTORNEY

# United States Patent Office 3,352,550
Patented Nov. 14, 1967

3,352,550
SHAFT KILN DISCHARGE MECHANISM
Carl E. Rossi, Ludington, Mich., assignor to Harbison-Walker Refractories Company, Pittsburgh, Pa., a corporation of Pennsylvania
Filed Sept. 27, 1965, Ser. No. 490,366
2 Claims. (Cl. 263—29)

This invention pertains to large shaft kilns used to dead burn refractory grain, for example, magnesite. More particularly, it relates to discharge mechanism for shaft kilns wherein the total weight of the column of refractory being processed is large and the temperature of the discharge material is still elevated.

The requirements of a shaft kiln discharge mechanism are various. The discharge mechanism must be of simple construction and sufficiently sturdy to support the weight of the column of material being processed through the shaft kiln. The discharge mechanism should preferably have a positive action, that is, it should not depend upon gravitation alone. In order that the shaft kiln be versatile in the type of burning treatment it can render, the rate of discharge should be adjustable. For the material burned in the shaft kiln to receive uniform treatment, it is necessary that it descend uniformly through the column which forms the interior of the shaft kiln. The discharged mechanism, therefore, must remove feed material uniformly from the bottom of the column. These then are some of the requirements of a shaft kiln discharge mechanism.

There are several basic types of discharge mechanisms taught by the prior art. The least complicated type is a gravity discharge mechanism wherein the feed material is removed from the column through an opening on the side of the shaft kiln. Such a device is shown in United States Patent 2,512,899. The gravity discharge mechanism can be considerably improved by addition of a vibration device which enables automatic removal of the material from the column. Such a device is shown in United States Patent 2,785,885.

Probably the most common type of a discharge device comprises some form of grates at the bottom of the shaft kiln column. These grates may rotate as for example in United States Patents 2,464,304, or 3,101,935.

Another type of discharge mechanism involves a rotating cone or table at the base of the column. In one variation, the cone is mounted eccentrically to allow material to escape between the edge of the cone and the base of the column. Such a device is shown in United States Patent 2,520,384. In another variation of the rotating discharge mechanism, stationary scraper arms remove the feed material from a rotating table at the base of the shaft kiln.

The type of discharge mechanism most similar to this invention comprises a stationary table and rotating rabble arms which push material off the edge of the table, as for example, in United States Patent 2,632,692.

All of the above described discharge mechanisms have to some degree fulfilled the requirements enumerated above. The gravity discharge mechanism is deficient in not having a positive discharge action and an adjustable rate of speed. Mechanisms involving grates are reasonably adequate except where the feed column is very high and therefore heavy and the temperature of the discharge material is above, for example, 500° F. It is difficult to design the grates to be water cooled and sufficiently strong to support heavy loads. The rotating column or table mechanisms can be easily designed to be water cooled and sufficiently strong, but have the general failing of causing nonuniform descent of the feed material in the column. This is because the feed material is removed from the sides of the column and not uniformly across the bottom. The capabilities of the stationary table type mechanism are very similar to the rotating cone or table mechanism. The main deficiencies of this device are nonuniform descent within the column, and the difficulty of water cooling the arms.

It is an object of this invention to provide a shaft kiln discharge mechanism of simple contruction which will support the weight of a heavy column of material, which will have a positive discharge action and an adjustable speed, which can withstand elevated temperatures of the discharge material, for example, above 500° F., and which will promote uniform descent of feed material through the column.

Briefly, according to one aspect, the objects of this invention are achieved as follows: A table is placed at the base of the shaft kiln perpendicular to the column and parallel to the base. A hollow drag bar guided by a track at each end and fastened at each end to hollow push rods reciprocates back and forth across the table. The push rods are coupled to the pistons of hydraulic cylinders which provide the reciprocating motion. Cooling liquid enters one hollow push rod, passes through it, then passes to the hollow drag bar by means of a flexible hose, from the hollow drag bar the water flows through another flexible hose into the push rod on the other side and exits from that push rod.

Other objects, and further features and advantages of this invention will become readily apparent to those skilled in the art from a study of the following detailed description with reference to the appended drawings. In these drawings, FIG. 1 is a schematic side elevation in partial section, taken along the line AA in FIG. 2, of the bottom of a high temperature shaft kiln embodying the concepts of this invention;

FIG. 2 is a schematic plan view in partial section, taken along line BB in FIG. 1.

Before describing the drawings in detail, it should be understood that they are but exemplary of construction embodying the concepts of this invention, and are given by way of explanation and not by way of limitation. In FIG. 1 there is shown the bottom portion of a typical vertical kiln which is capable of dead burning refractory materials above about 3000° F. The kiln is defined by a relatively thin tubular outer shell 12 and the internal refractory lining 11. The dead burning of the feed material 13 takes place in the column 10. The top end of the column is the feed end and the bottom end of the column is the discharge end. The refractory lining 11 is of substantial thickness and may be on the order of 2 to 3 feet as compared to about ½ inch thickness for the shell 12.

A plurality of curved bottom plates are arranged to form an inwardly converging skirt 25 of such dimensions as to abut and support the downward converging outer surface of the truncated bottom portion of the refractory lining 11. The converging skirt 25 defines a collection chamber. The collection chamber is air tight so that a positive pressure can be maintained in the lower end of the column 10. The discharge mechanism is completely contained within the collection chamber. A table 14 having a flat surface and a rectangular top larger than the opening at the base of the shaft kiln column is orientated perpendicular to the column and parallel to the base. A generally rectangular hollow drag bar 15, which is as long as the table (i.e., longer than the widest portion of the column at the base of the shaft kiln) is attached at each end to a push rod 16 and guided at each end by a top and bottom track 17. The drag bar contains an orifice 27 at each end for introducing or removing cooling water through the hollow center of the drag bar. The drag bar is parallel to the table and perpendicular to the column. The push rods 16 are hollow and closed at each end. The push rods are attached at one end to the drag bar 15 and are perpendicular to the drag bar. The opposite end is attached by a coupling 21 to the actuating hydraulic piston rod 22. The push rod passes through the skirt of the collection chamber 25. Packing glands 19 provide a seal for the push rods passing through the skirt of the collection chamber. The push rods contain an orifice near the coupling end 20 and an orifice near the drag bar end 26 for the introducing, removing and cooling of liquid from the cooling liquid supply. The length of the push rods depends on the configuration of the table and the collection chamber, but must be long enough so that the drag bar can be on the opposite side of the table while the orifice 20 at the coupling end remains outside the skirt. A connecting hose at 18 connects the orifice at the drag bar end of each push rod and the orifice at each end of the drag bar. The guide tracks 17 are arranged perpendicular to the drag bar and parallel to the push rods above and below the drag bar. These tracks guide the drag bar across the table. The coupling 21 joins the push rod with the hydraulic piston rod 22 and cylinder 23 that provide a reciprocating motion. The travel of the piston should be the same distance as the width of the column at the base of the shaft kiln.

In general, the discharge mechanism of this invention operates as follows: Refractory material 13 falls from column 10 to rest on table 14. Drag bar 15 is reciprocally guided across the table 14 by tracks 17 under the influence of push rods 16 to thereby remove refractory from the table to the collection chamber.

The push rods and drag bar are hollow and continuously cooled by liquid, for example (water) which circulates through them and the interconnected conduits discussed above.

Having thus described the invention in detail and with sufficient particularity as to enable those skilled in the art to practice it, what is desired to have protected by Letters Patent is set forth in the following claims:

I claim:

1. In a shaft kiln for burning refractory materials having a vertical column wherein said materials are burned, said shaft kiln having a feed end at the top of the column and a discharge end at the base of the column enclosed in a collecting chamber, a discharge mechanism within said collecting chamber comprising a table with a rectangular top larger than the opening at the base of the column perpendicular to said vertical column to support said materials in the column inside said collecting chamber, a hollow drag bar which reciprocates across said table having an orifice on each end, a guide track at each end of said drag bar slidably attached to said drag bar to stabilize it during its reciprocating motion, a pair of hollow push rods attached at one end to said drag bar and having a coupling at the opposite end and having orifices at each end, a pair of hydraulic cylinders and pistons provide reciprocating motion across the width of the column at the discharge end of the shaft kiln to said hollow push rods, there being attached by said couplings to said push rods, a cooling liquid supply, a pair of flexible hoses connecting the orifices on said drag bar to the orifices on said push rods, another pair of flexible hoses connecting the orifices on the coupling end of said push rods and said cooling liquid supply.

2. In a shaft kiln for burning refractory materials having a vertical column wherein said materials are burned, said shaft kiln having a feed end at the top of the column and discharge end at the bottom enclosed in a collection chamber a discharge mechanism within said collecting chamber comprising, a table means larger than the discharge end of the column for supporting the materials in the vertical column inside said collecting chamber, a hollow means for pushing a layer of material from the bottom of said column off the material supporting means when reciprocating across it, a means for guiding said material pushing means being slidable attached to said pushing means, a means for imparting reciprocal motion across the column at the discharge end of the shaft kiln to the material pushing means external of the collecting chamber, a hollow means for connecting the material pushing means with the reciprocating motion means passing through the wall of said collection chamber, a means for supplying cooling liquid, hollow means for joining the material pushing means and the connecting means so that the cooling liquid can enter one connecting means external to said chamber, pass through said connecting means, said joining means, said material pushing means, the opposite joining means, the opposite pushing means and exit from said pushing means outside said chamber.

References Cited

UNITED STATES PATENTS

| 900,390 | 10/1908 | Kingsley | 214—29 X |
| 1,014,258 | 1/1912 | Ross | 214—23 |
| 1,066,184 | 7/1913 | Canham | 110—165 X |

FOREIGN PATENTS

| 76,902 | 7/1918 | Switzerland. |

FREDERICK L. MATTESON, JR., *Primary Examiner.*

D. A. TAMBURRO, *Assistant Examiner.*